(No Model.) 2 Sheets—Sheet 1.
G. WILKIN.
BERRY OR SEED GATHERER AND CLEANER.
No. 375,787. Patented Jan. 3, 1888.
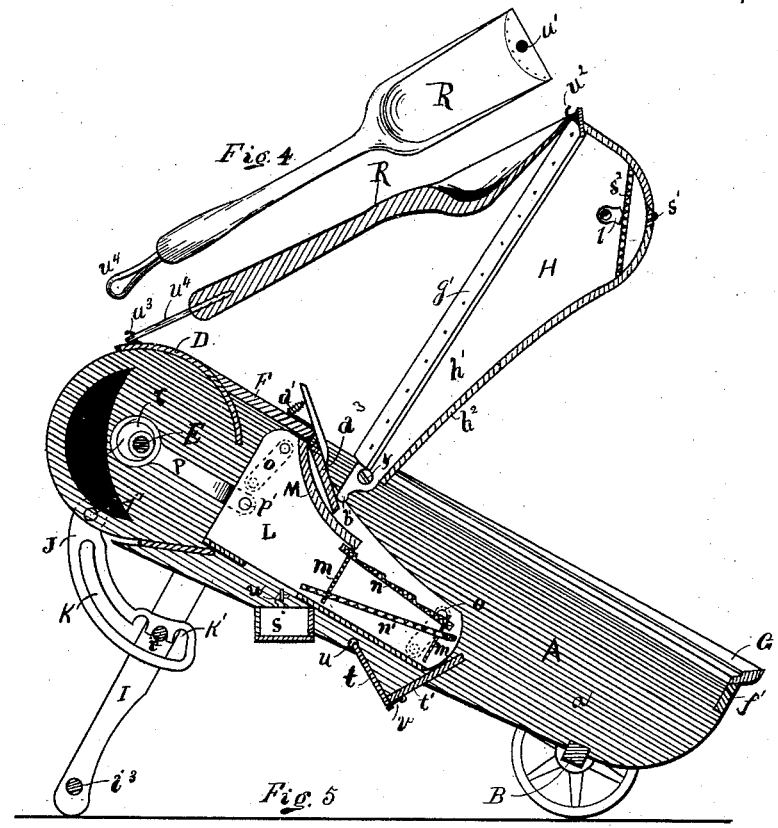
Fig. 4.
Fig. 5.
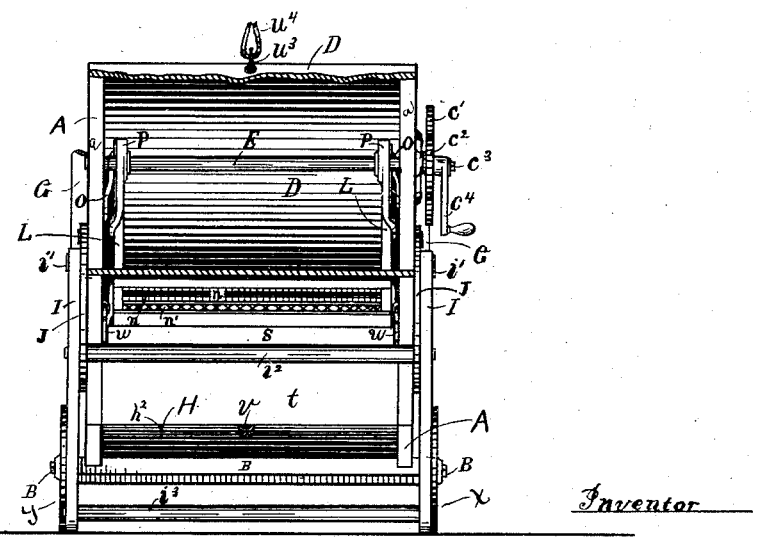
Fig. 6.
Witnesses:
Emmet Horton
Jesse J. Paddock
Inventor
George Wilkin
Per E. Horton attorney (No Model.) 2 Sheets—Sheet 2.
G. WILKIN.
BERRY OR SEED GATHERER AND CLEANER.
No. 375,787. Patented Jan. 3, 1888.
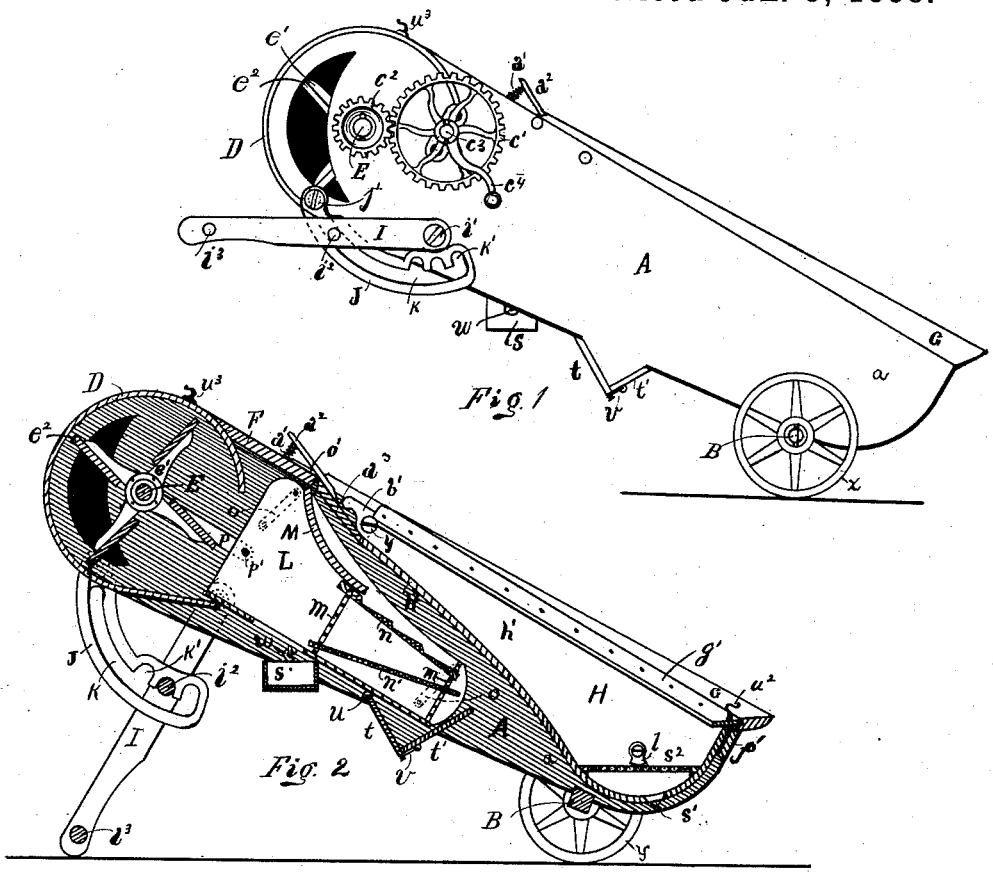
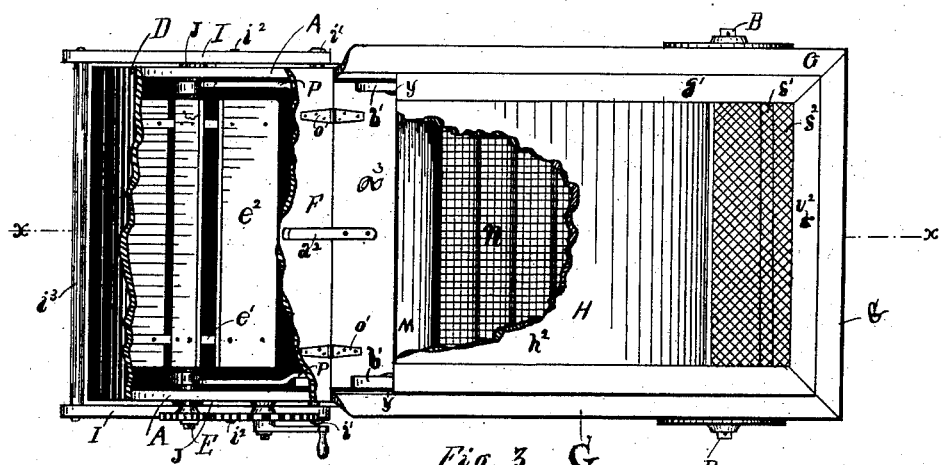

UNITED STATES PATENT OFFICE.

GEORGE WILKIN, OF DUNDEE, NEW YORK.

BERRY OR SEED GATHERER AND CLEANER.

SPECIFICATION forming part of Letters Patent No. 375,787, dated January 3, 1888.

Application filed December 30, 1886. Serial No. 223,002. (No model.)

*To all whom it may concern:*

Be it known that I, GEORGE WILKIN, a citizen of the United States, residing at Dundee, in the county of Yates and State of New York, have invented a new and useful Combined Berry or Seed Gatherer and Cleaner, of which the following is a specification.

My invention relates to an improvement in berry or seed gatherers; and it consists in certain novel features of construction and combinations of parts, as more fully described hereinafter, and pointed out in the claims.

In the accompanying drawings, Figure 1 represents a side elevation of my complete device; Fig. 2, a central longitudinal section; Fig. 3, a plan view showing the hopper and drum partially broken away; Fig. 4, a detail plan view of the paddle; Fig. 5, a longitudinal section showing the drum partially broken away and the fans removed, the hopper being held in upright adjustment by the paddle; and Fig. 6 a rear view with the fans removed and the drum partially broken away.

The main frame A is composed of the side pieces, $a$, connected and strengthened by the axle B and the cross-bar $f'$, secured to the forward portion of the frame, and by the cross-piece F, secured to the upper rear portion. The frame is further strengthened by the drum-sheet D, which is nailed or otherwise secured to the rear ends of the side pieces, $a$, which have been rounded and recessed, so that the drum-sheet will have a circular form when secured thereto. The whole frame and contents are supported by the axle B, which is carried by the wheels X Y journaled thereon. Journaled in suitable bearings in the ends of the drum D is the fan-shaft E, to which the fans $e^2$ are secured by means of the radially-projecting arms $e'$. Upon the end of the fan-shaft E which projects through the side of the drum D is keyed a suitable pinion, $c^2$, adapted to mesh with a gear, $c'$, journaled upon a shaft, $c^3$, projecting from the frame of the machine, and the gears and fan are adapted to receive motion through the medium of the crank $c^4$, adjustably keyed to the hub of the gear $c'$.

Located in the fore part of the frame A is the hopper H, which is pivoted at its rear end to the side pieces of the main frame by means of the studs or pins $y$. This hopper is made of a size sufficient to fill the fore part of the frame, and is provided with a rearward and upwardly-sloping bottom, so that when lowered it will not interfere with the fan-and-sieve mechanism located in the rear part of the frame. The bottom of the deepest portion of the hopper is provided with a transverse slot adapted to be closed by a slide, S', and located above and covering this slot is a sieve or screen, S², held in place by a button, $l$, for the purpose of relieving the berries at the time of falling into the hopper of such dirt as will then separate from them. The sides of the hopper at their rear ends project beyond the pins $y$, as at $b'$, for the purpose of pressing down upon and opening the throat-board $a^3$ when the hopper is raised, in the manner as will hereinafter appear.

Secured to the upper edges of the side pieces, $a$ $a$, and the cross-piece $f'$ of the main frame, in such a manner as to project beyond the sides of the frame and slant upwardly, are the strips of metal or wood which form the crown or flanges G, which are suitably mortised together at the corners and rabbeted out on the upper surface of their lower edges to receive the upper ends of the strips or flanges $g'$, similarly secured to the upper edges of the side pieces of the hopper H. These strips or flanges serve to catch the rebounding berries as they are knocked from the bushes and guide them into the hopper.

Located below the pivoted end of the hopper H and hinged to the cross-piece F is a door or throat-board, $a^3$, of a size sufficient to completely close the opening between the cross-piece F and the hopper when in its normal position. This throat board is yieldingly held against downward pressure by the tension of the spring $a'$, having one end attached to the cross-piece F, and the opposite end to a bar or rod attached to the throat-board $a^3$. Thus it will be seen that when the hopper is raised the projections $b'$ will press down the throat-board $a^3$ and open the throat leading from the hopper to the fan and cleaning mill located below.

A shoe, L, of the usual form, is suspended by hangers O within the frame A below the throat-board $a^3$, with its open end in direct communication with the opening in the drum D, so as to receive a constant blast of air from the fans. Oscillating motion is imparted to the shoe through the medium of pitmen P, pivoted to the rear of the shoe at $p'$ and encircling eccentrics $r$, located on the fan-shaft E.

Secured within the shoe L, directly below the throat-board, is a curved receiving-board, M, so situated as to guide the berries which fall upon its surface to the sieves $n\ n'$, removably located upon cleats $m$, attached to the sides of the shoe. The sieve $n$ is formed with a step-like surface to give the berries a rolling motion as the shoe is oscillated and thus greatly assist in freeing them from adhering dirt and leaves. As the berries fall from the sieves $n'$ they pass through an opening in the bottom of the shoe and drop into a suitable receptacle or box, S, loosely hung, by means of hooks $w$, to the bottom of the frame, from which they can be removed at the leisure of the operator.

A trough composed of boards $t\ t'$ extending across the bottom of the frame and secured thereto is placed beneath the forward end of the shoe L, for the purpose of catching all berries or seeds which may blow or shake over the lower ends of the sieves. The board $t$ is suitably hinged to the frame A at $u$, and is held in closed adjustment to board $t'$ by means of the hook and staple $v$. Thus the trough may be relieved of its contents, when desired, by simply releasing the hook $v$ and allowing the board $t$ to swing open.

Legs or handles I are pivoted to the sides of the frame by suitable screws or pins, $i'$, and are strengthened and connected by cross-bars $i^2\ i^3$.

Curved braces J are pivoted, by screws or studs $j'$, to the sides of the main frame at a distance from the pivotal points of the handles or supports I greater than the radius of the circle in which the cross-bar $i^2$ moves. These braces J are provided with a longitudinal slot, K, through which the brace $i^2$ passes and in which it works, and they are also provided with a series of notches, K', in the upper surface of the slots, in which the brace or cross-bar $i^2$ is adapted to be locked when performing the functions of legs or supports.

Thus it will be seen that when the parts I are to be raised from the position shown in Fig. 2 to that in Fig. 1 the braces must be lifted to release the cross-bar $i^2$ from the notches holding it, and then as the handles or legs are raised the bar $i^2$ will pass through the arc-shaped slot K and draw the free end of the brace J up in contact with the pivotal end of the legs or handles, as shown in Fig. 1.

In using my device the operator has simply to take hold of the handles I and wheel the entire machine up to the bushes from which he desires to gather the berries. He then adjusts the handles to form legs and takes the paddle R and knocks the berries from the bushes into the hopper H. When a sufficient quantity of berries or seeds has been gathered into the hopper, the operator catches the hook $u^2$ on the forward end of the hopper in the aperture $u'$ in the end of the paddle and raises the hopper, and then catches the loop $u^4$ in the end of the paddle over the hook $u^3$, located on the drum D. Thus the hopper is held in raised adjustment; and as the throat-board $a^3$ is depressed and the throat opened by the projections $b'$, when the hopper is raised the contents thereof will be guided by the receiving-board M into the fanning and cleaning mill, which is being operated through the medium of the crank and gears connected therewith, where the berries or seeds will be thoroughly cleaned and then dropped into the receptacle S.

It is evident that numerous slight changes might be resorted to in the construction of the parts shown; hence I do not wish to limit myself strictly to the parts herein described, but consider myself entitled to all such changes as fall within the spirit and scope of my invention.

Having thus fully described my invention, what I claim as new, and desire to secure by Letters Patent, is—

1. In a berry or seed gatherer, a suitable frame mounted upon wheels at its forward end and provided with supporting legs or handles at its rear end, a hopper pivoted in said frame and having its free end supported in the forward part thereof, in combination with a fanning and cleaning mill located below and at the rear of the pivotal point of the hopper, substantially as described.

2. In a berry or seed gatherer, the combination of a suitable frame, a hopper pivoted in said frame and having its free end supported in the forward part thereof, a throat-board located at the pivoted end of said hopper, and a fanning and cleaning mill also located in said frame, substantially as described.

3. In a berry or seed gatherer, a suitable frame and a hopper pivoted therein provided upon its rear end with suitable projections, in combination with a spring-actuated throat-board hinged to said frame and operated by said projections, in the manner substantially as described.

4. In a berry or seed gatherer, a suitable frame and a hopper pivoted therein, said hopper being provided with a hook upon its free end, in combination with a paddle having an aperture in its end adapted to engage with said hook, whereby the hopper can be raised and emptied from the rear, substantially as described.

5. In a berry or seed gatherer, a pivoted hopper having a hook upon its free end, in combination with a paddle provided with a hole in its scoop portion, and a loop or hole in its handle, and a hook upon the body portion of the gatherer, with which said loop is adapted to engage, substantially as described.

6. In a berry or seed gatherer, a suitable frame mounted upon wheels in front, in combination with a pair of arms pivoted to the rear portion of said frame and connected by cross-bars, and braces having one end pivoted to said frame and provided with longitudinal slots in which one of said cross-bars is confined and adapted to operate, the upper wall of said slots being provided with locking-notches for engaging with said cross-bars when the arms are serving as legs, in the manner substantially as described.

7. In a berry or seed gatherer, a frame mounted upon wheels in front and having a projecting crown or flange on top of its front portion, in combination with a hopper mounted therein and having a crown or flange upon its top edges fitting within said flange upon the frame, substantially as described.

8. The combination, in a berry or seed gatherer, of a receiving and dumping hopper pivoted in a traveling frame, and having its free end supported in the forward part thereof, said hopper being deepest at its free end and gradually decreasing in depth toward its pivotal point, a cleaning-mill located below the pivotal point of said hopper, and a fan located at the rear thereof, substantially as described.

GEORGE WILKIN.

Witnesses:
E. HORTON,
JESSE J. PADDOCK.